United States Patent [19]

Sato et al.

[11] Patent Number: 5,050,971
[45] Date of Patent: Sep. 24, 1991

[54] VARIABLE FOCAL LENGTH PHOTO-TAKING OPTICAL SYSTEM

[75] Inventors: Susumu Sato, Chiba; Koichi Wakamiya, Tokyo; Koichi Ohshita, Kawasaki, all of Japan

[73] Assignee: Nikon Corporation, Tokyo, Japan

[21] Appl. No.: 405,678

[22] Filed: Aug. 23, 1989

[30] Foreign Application Priority Data

Aug. 25, 1988 [JP] Japan .................................. 63-211180

[51] Int. Cl.$^5$ ............................................. G02B 15/02
[52] U.S. Cl. ..................................... 359/675; 359/672; 359/680; 359/683
[58] Field of Search ................. 350/422, 423, 426, 427

[56] References Cited

U.S. PATENT DOCUMENTS 4,591,234 5/1986 Hamanishi ............................ 350/422

Primary Examiner—Scott J. Sugarman
Attorney, Agent, or Firm—Shapiro and Shapiro

[57] ABSTRACT

A variable focal length photo-taking optical system includes a photo-taking objective lens, and a conversion lens removably added to the photo-taking objective lens and relatively movable along the optic axis with at least some lens groups of the photo-taking objective lens to change the combined focal length of the photo-taking objective lens and the conversion lens.

22 Claims, 6 Drawing Sheets

VARIABLE FOCAL LENGTH PHOTO-TAKING OPTICAL SYSTEM

BACKGROUND OF THE INVENTION

1. Field of the Invention

This invention relates to the magnification changing photo-taking optical system capable of being contained in an electronic still camera or the like.

2. Related Background Art

In a single-lens reflex camera or the like, there is known an auxiliary lens such as a front conversion lens adapted to be mounted forwardly of a photo-taking lens system to vary the focal length or a rear conversion lens adapted to be mounted rearwardly of the photo-taking lens to vary the focal length.

Also in a lens shutter type camera, there is known a two-focus lens in which a rear conversion lens is designed to be capable of being removably mounted rearwardly of a fixed focus lens and accomplishing photographing with the focal length changed.

However, the front conversion lens adapted to be mounted forwardly of the photo-taking lens is relatively large and heavy in itself and therefore the operability of the camera becomes worse, and this is not preferable. Also, both the front conversion lens and the rear conversion lens adapted to be mounted rearwardly of the photo-taking lens need be mounted to the photo-taking lens each time and therefore, they suffer from the problem that it is impossible to effect a magnification change in a moment and the magnification changing operation is cumbersome.

Further, the conventional two-focus lens contained in a camera is preferable for making the camera compact, but can only accomplish photographing at two focal lengths and it has been impossible to change the focal length to more than two kinds.

SUMMARY OF THE INVENTION

It is therefore an object of the present invention to solve the above-noted problems and to provide a magnification changing photo-taking optical system which contrives to make a fixed focus lens into a zoom lens or changes the variable focal length area of a zoom lens to another variable focal length area to thereby enable photographing within a wide variable focal length range to be accomplished and yet can accomplish a magnification change relatively quickly and moreover is compact and capable of being contained in a camera or the like.

To achieve the above object, the photo-taking optical system of the present invention is a magnification changing photo-taking optical system which has an objective lens and a conversion lens removably mountable with respect to the objective lens and in which during a magnification change, the conversion lens is mounted to thereby make the combined focal length of the objective lens and the conversion lens greater or smaller than the focal length of the objective lens, characterized in that after the conversion lens has been added to the objective lens, at least a part of the objective lens and the conversion lens are moved relative to each other along the optic axis to vary the principal point interval between the objective lens and the conversion lens, thereby varying the combined focal length.

By the construction as described above, the phototaking optical system of the present invention maintains a compact shape and can be contained in a camera body or the like and yet contrives to make a fixed focus lens into a zoom lens, and changes the variable focal length area of a zoom lens or the like to another variable focal length area, thereby enabling a substantially wider focal length range to be photographed.

Moreover, in the present invention, the conversion lens is moved along the optic axis to contribute to a magnification change, whereby an efficient magnification change can be realized while the full length of the magnification changing photo-taking optical system is kept relatively short.

Further objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the accompanying drawings.

Figure 1:
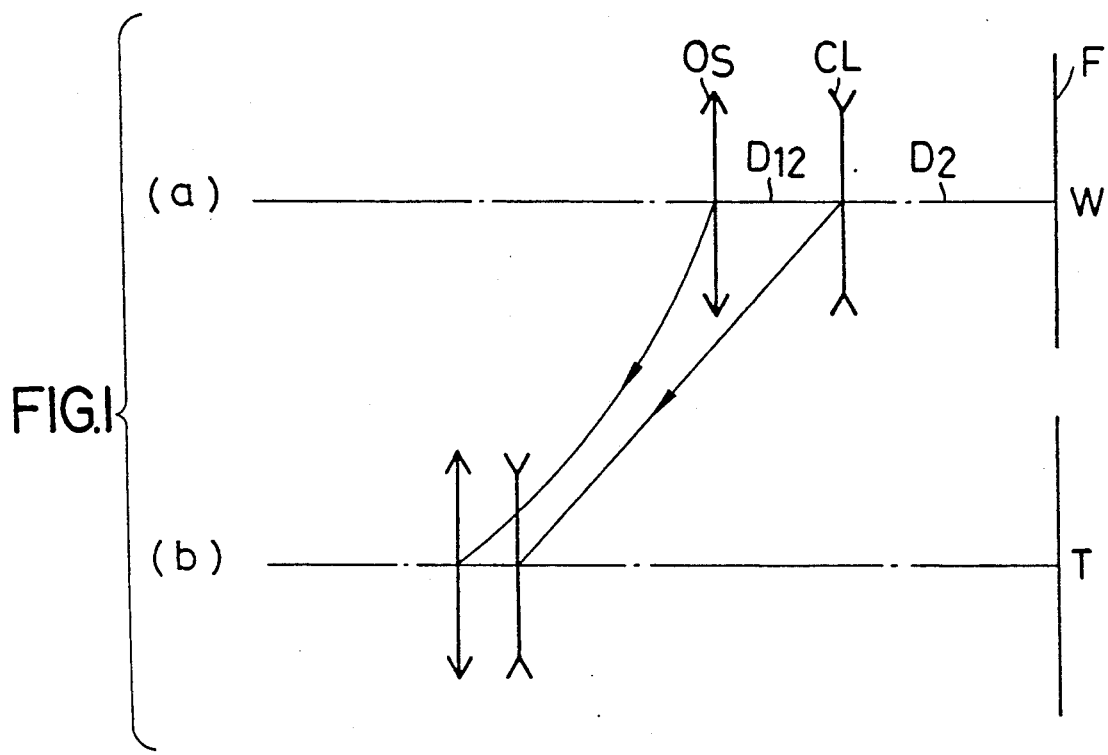
FIG. 1 is a schematic optical system arrangement diagram showing a lens arrangement in a state in which a conversion lens having a negative refractive power is added to an objective lens in a first embodiment of the present invention and the displaced state of the lens during a magnification change.
Figure 2:
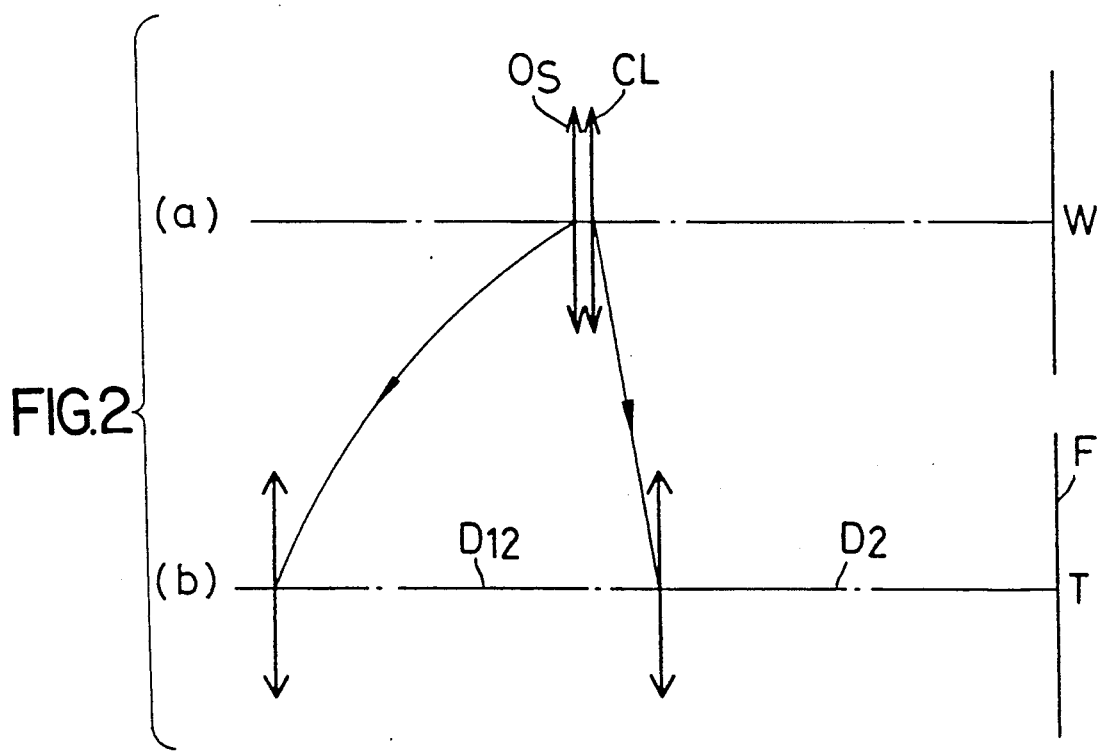
FIG. 2 is a schematic optical system arrangement diagram showing a lens arrangement in a state in which a conversion lens having a positive refractive power is added to an objective lens in a second embodiment of the present invention and the displaced state of the lens during a magnification change.

FIGS. 1 and 2 show first and second embodiments, respectively, of the present invention.

The magnification changing photo-taking optical system in the first and second embodiments of the present invention has a conversion lens CL removably provided at the image side of a fixed focus lens $O_s$ which is an objective lens, and by the conversion lens CL being mounted, the combined focal length $f_c$ of the fixed focus lens $O_s$ and the conversion lens CL is varied and further, by the fixed focus lens $O_s$ and the conversion lens CL being moved along the optic axis, the fixed focus lens $O_s$ is made into a zoom lens. To make the present invention compact and simple in construction, it is desirable that the conversion lens CL be disposed rearwardly of the objective lens.

The first and second embodiments will hereinafter be described specifically.

First Embodiment

Figure 3:
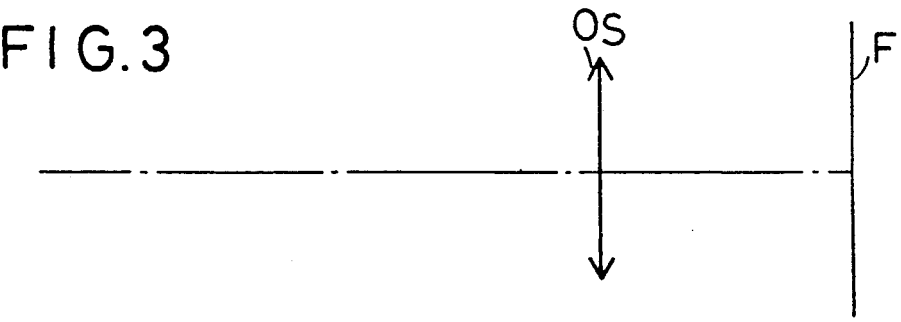
FIG. 3 is a schematic lens arrangement diagram showing the singly used state of the objective lens used in the first embodiment of the present invention shown in FIG. 1 and the second embodiment of the present invention shown in FIG. 2.

In the first embodiment shown in FIG. 1, in order to make the objective lens $O_s$ which is a photo-taking fixed focus lens of a focal length $f_s$ of 35.00 as shown in FIG. 3 into a zoom lens, the objective lens $O_s$ lying at a position of 35.0 from the image plane F and being in focus to infinity is first axially moved by 12.2 toward the object side, and as shown in FIG. 1, a conversion lens CL (focal length $f_{CL} = -41.0$) having a negative refractive power is disposed at a position of $D_{12} = 17.9$ rearward of the objective lens $O_s$, whereby the enlargement of the combined focal length $f_c$ of the objective lens $O_s$ and the conversion lens CL is contrived. This state is the state of the wide angle end W as shown in FIG. 1(a).

The zooming from the wide angle end W to the telephoto end T is accomplished by the objective lens $O_s$ and the conversion lens CL being moved toward the object side so that the spacing $D_{12}$ between the objective lens $O_s$ and the conversion lens CL is reduced as shown in FIGS. 1(a) and (b).

Here, the focal length of the magnification changing optical system in a state in which the conversion lens CL is added to the objective lens $O_s$ is $f_c$, the distance from the principal point of the objective lens $O_s$ to the principal point of the conversion lens CL is $D_{12}$, and the distance from the principal point of the conversion lens CL to the image plane F is $D_2$, and the lens arrangement in each focal length state when the conversion lens CL is added to the objective lens $O_s$ is shown in Table 1 below.

TABLE 1

| (the lens arrangement in each focal length state when the conversion lens CL is added to the objective lens $O_s$) | | | |
|---|---|---|---|
| $f_c$ | 60.0 | 80.0 | 100.0 |
| $D_{12}$ | 17.916 | 11.937 | 8.350 |
| $D_2$ | 29.287 | 52.716 | 76.145 |

As can be seen from the lens arrangement shown in Table 1 above, there can be achieved a magnification changing photo-taking optical system whose magnification can be changed in a wide range of the overall focal length $f_s = 35.0$, $60.0 - 100.0$.

Second Embodiment

In the second embodiment shown in FIG. 2, in order to make the objective lens $O_s$ which is a fixed focus lens of a focal length $f_s$ of 35.00 shown in FIG. 3 which is similar to the first embodiment into a zoom lens, the objective lens $O_s$ whose principal point lies at a position of 35.00 from the image plane F is first moved by 7.3 toward the image side, and a conversion lens CL (focal length $f_{CL} = 41.00$) having a positive refractive power is disposed at a position of $D_{12} = 13.6$ rearward of the objective lens $O_s$, whereby a reduction in the combined focal length $f_c$ of the objective lens $O_s$ and the conversion lens CL is contrived. This state is the state of the telephoto end T as shown in FIG. 2(b).

The zooming from the telephoto end T to the wide angle end W is accomplished by the objective lens $O_s$ being moved toward the image side and the conversion lens CL being rectilinearly moved toward the object side so that the spacing between the objective lens $O_2$ and the conversion lens CL is reduced.

Here, the focal length of the magnification changing optical system in a state in which the conversion lens CL is added to the objective lens $O_s$ is $f_c$, the distance from the principal point of the objective lens $O_s$ to the principal point of the conversion lens CL is $D_{12}$, the distance from the principal point of the conversion lens CL to the image plane F is $D_2$, and the lens arrangement in each focal length state when the conversion lens CL is added to the objective lens $O_s$ is shown in Table 2 below.

TABLE 2

| (the lens arrangement of each lens group in each focal length state when the conversion lens CL is added to the objective lens $O_s$) | | | |
|---|---|---|---|
| $f_c$ | 19.0 | 21.0 | 23.0 |
| $D_{12}$ | 0.474 | 7.667 | 13.609 |
| $D_2$ | 18.743 | 16.400 | 14.057 |

As can be seen from the lens arrangement shown in Table 2 above, there can be achieved a magnification changing photo-taking optical system whose magnification can be changed in a wide range of the overall focal length $f_s=19.0-23.0, 35.0$.

Magnification changing photo-taking optical systems according to third to eighth embodiments of the present invention each has a conversion lens CL removably provided rearwardly of a zoom lens which is an objective lens $O_Z$, and by the conversion lens CL being mounted, the combined focal length $f_c$ of the zoom lens $O_Z$ and the conversion lens CL is varied and further, by at least one group of the zoom lens $O_Z$ and the conversion lens CL being moved along the optic axis, the combined focal length is changed to a different variable focal length range from the second wide angle end $W_2$ to the second telephoto end $T_2$ when the conversion lens CL is added.

Particularly, to reliably achieve efficient magnification change, good aberration correction and compactness of the magnification changing photo-taking optical system in a case where a variable focus lens is used as the objective lens of the present invention, it is desirable to construct it so as to satisfy the following conditions (1) and (2):

$$f_{oc} > \sqrt{f_W \cdot f_T} \quad (1)$$

$$0 \leq L_{CT} \leq L - L_{Min} \quad (2)$$

where
- $f_{oc}$: the focal length of the variable focal length objective lens in a state in which the conversion lens is to be disposed.
- $f_W$: the focal length of the variable focal length objective lens at the wide angle end.
- $f_T$: the focal length of the variable focal length objective lens at the telephoto end.
- $L_{CT}$: the distance from the lens surface of said photo-taking objective lens which is most adjacent to the image side to the lens surface of said conversion lens which is most adjacent to the object side in the state in which said conversion lens is added.
- $L$: The distance from the lens surface of said photo-taking objective lens which is most adjacent to the image side to the image plane in the state in which said conversion lens is added.
- $L_{Min}$: the distance in a state in which the distance from the surface of the last movable lens group of the variable focal length objective lens to the image plane is minimum.

The above-mentioned conditions will hereinafter be described specifically.

The condition (1) prescribes for the conversion lens to be disposed in such a focal length state that the focal length of the objective lens in which the conversion lens is to be disposed becomes greater than the geometrical mean of the focal length of the objective lens at the wide angle end and the focal length of the objective lens at the telephoto end, and is a condition for accomplishing an efficient magnification change while maintaining a compact shape and a good imaging performance in the lens system. If the range of this condition (1) is departed from, to obtain a desired combined focal length, the refractive power of the conversion lens must be made great and aberration correction will become difficult. Therefore, if an attempt is made to effect aberration correction in such state in which the refractive power is made great, the burden of the conversion lens will become great with a result that the conversion lens will become bulky, and this is not preferable.

The condition (2) prescribes an appropriate position at which the conversion lens should be disposed to make the magnification changing photo-taking optical system compact, and is a condition for constructing the conversion lens with a relatively weak refractive power and accomplishing good aberration correction while making the lens diameter of the conversion lens compact.

If the range of the condition (2) is departed from, to image an oblique light ray of a relatively great angle of view, the lens diameter of the conversion lens will necessarily become great and moreover, it will be unavoidable to adopt a construction in which the refractive power of the conversion lens is strong, and aberration correction will become difficult.

The third to eighth embodiments shown in FIGS. 4 to 13 will hereinafter be described specifically. In each of the embodiments which will hereinafter be described, the wide angle end and the telephoto end of singly the zoom lens which is an objective lens $O_Z$ will be referred to as a first wide angle end $W_1$ and a first telephoto end $T_1$, respectively.

Third Embodiment

Figure 4:
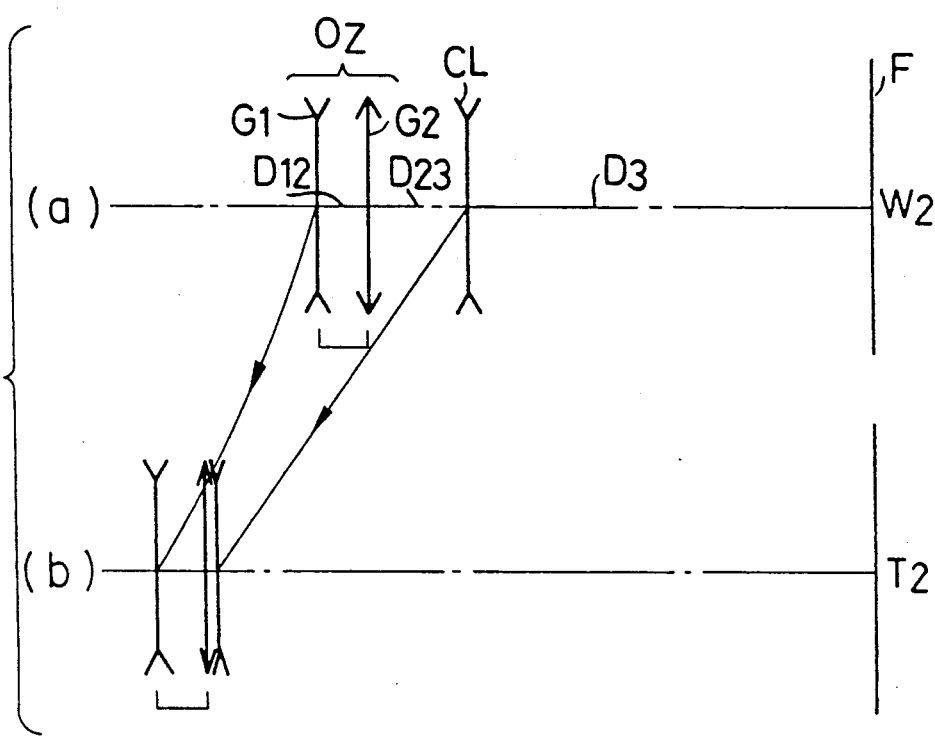
FIG. 4 is a schematic optical system arrangement diagram showing a lens arrangement in a state in which a conversion lens having a negative refractive power is added to an objective lens in a third embodiment of the present invention and the displaced state of the lens during a magnification change.

In the third embodiment shown in FIG. 4, there is adopted a system in which a conversion lens CL is moved along the optic axis while a two-group zoom lens $O_Z$ which is an objective lens is kept in a predetermined focal length state, whereby the combined focal length $f_c$ of the zoom lens $O_Z$ and the conversion lens CL is varied.

Figure 5:
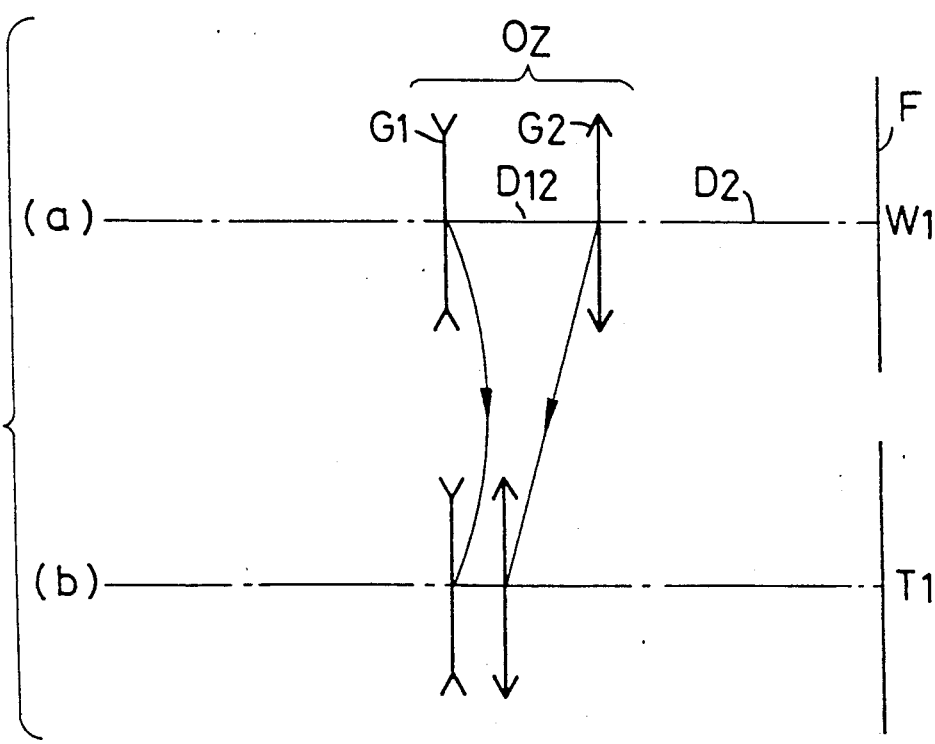
FIG. 5 is a schematic lens arrangement diagram showing a lens arrangement in the singly used state of the objective lens used in the third embodiment of the present invention shown in FIG. 4 and the displaced state of the lens during a magnification change.

The objective lens $O_Z$ in this third embodiment comprises two negative and positive groups of a focal length $f_o=36.0-68.0$ as shown in FIG. 5, and the focal length $f_1$ of the first lens group G1 in this zoom lens $O_Z$ is $-50.00$, and the focal length $f_2$ of the second lens group G2 is 35.00. The zooming of this objective lens $O_Z$ from the first wide angle end $W_1$ to the first telephoto end $T_1$ is accomplished by the first lens group G1 being moved toward the image side so as to depict convexity and at the same time, the second lens group G2 being moved toward the object side so that the spacing between the first lens group G1 and the second lens group G2 is reduced as shown in FIGS. 5(a) and (b).

Here, the focal length of the objective lens $O_Z$ is $f_o$, the distance from the principal point of the first lens group G1 to the principal point of the second lens group G2 is $D_{12}$, and the distance from the principal point of the second lens group G2 to the image plane F is $D_2$, and the lens arrangement of the lens groups in the objective lens $O_Z$ constituting a part of the third embodiment of the present invention is shown in Table 3 below.

TABLE 3

| (the objective lens $O_Z$ for the third embodiment) | | | |
|---|---|---|---|
| $f_o$ | 36.0 | 51.6 | 68.0 |
| $D_{12}$ | 33.611 | 18.915 | 10.735 |
| $D_2$ | 60.200 | 71.120 | 82.600 |

To enlarge the focal length range of the objective lens $O_Z$ in the third embodiment, a conversion lens CL (focal length $f_{CL}=-187.82$) having a negative refractive power is disposed at a position of $D_{23}=22.40$ rearward of the second lens group G2 of the objective lens $O_Z$ at the first telephoto end $T_1$ ($f_{oc}=68.0$) of the objective lens $O_Z$, as shown in FIG. 4. The combined state of the objective lens $O_Z$ and the conversion lens CL in the second wide angle end $W_2$ is shown in FIG. 4(a).

The zooming from the second wide angle end $W_2$ to the second telephoto end $T_2$ is accomplished by the first lens group G1 and the second lens group G2 being moved together toward the object side without the spacing $D_{12}$ therebetween being changed and at the same time, the conversion lens CL being rectilinearly moved toward the object side, as shown in FIGS. 4(a) and (b).

Here, the combined focal length of the magnification changing optical system in a state in which the conversion lens CL is added to the objective lens $O_Z$ is $f_c$, the distance from the principal point of the second lens group G2 to the principal point of the conversion lens CL is $D_{23}$, and the distance from the principal point of the conversion lens CL to the image plane F is $D_3$, and the lens arrangement of each lens group in each focal length state when the conversion lens CL is added to the objective lens $O_Z$ is shown in Table 4 below.

TABLE 4

(the lens arrangement in each focal length state when the conversion lens CL is added to the objective lens $O_Z$)

| $f_c$ | 100.1 | 110.0 | 120.0 |
|---|---|---|---|
| $D_{12}$ | 10.735 | 10.735 | 10.735 |
| $D_{23}$ | 22.400 | 10.889 | 1.214 |
| $D_3$ | 88.598 | 116.002 | 143.623 |

As can be seen from the lens arrangement shown in Table 4 above, a focal length $f_c=100.1-120.0$ can be added to the focal length $f_o=36.0-68.0$ of a zoom lens having a zoom ratio of the order of 2.0, thereby achieving a magnification changing optical system capable of accomplishing magnification change photographing within the range of overall focal length $f_s=36.0-68.0$ and 100.1-120.0.

Fourth Embodiment

Figure 6:
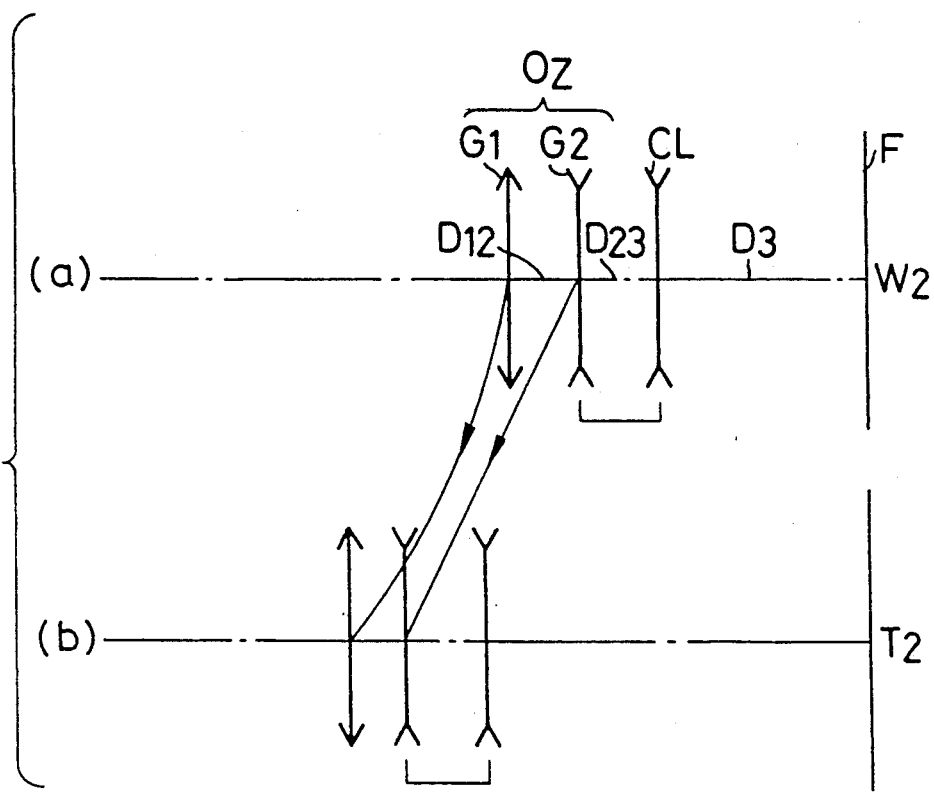
FIG. 6 is a schematic optical system arrangement diagram showing a lens arrangement in a state in which a conversion lens having a negative refractive power is added to an objective lens in a fourth embodiment of the present invention and the displaced state of the lens during a magnification change.

In a fourth embodiment shown in FIG. 6, there is adopted a system in which a conversion lens CL is moved along the optic axis with a second lens group G2 which is the last movable group of a two-group zoom lens which is an objective lens $O_Z$, whereby varying the combined focal length $f_c$ of the zoom lens $O_Z$ and the conversion lens CL.

Figure 7:
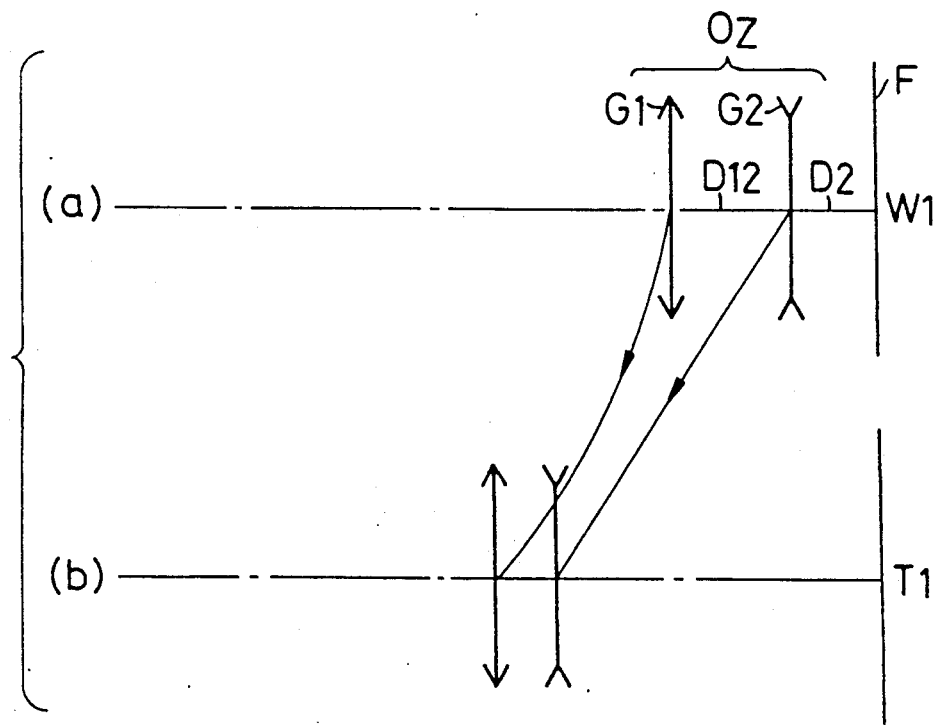
FIG. 7 is a schematic lens arrangement diagram showing a lens arrangement in the singly used state of the objective lens used in the fourth embodiment of the present invention shown in FIG. 6 and the displaced state of the lens during a magnification change.

The objective lens $O_Z$ in this fourth embodiment has a focal length $f_o=36.0-70.0$ and comprises two positive and negative groups as shown in FIG. 7, and the focal length $f_1$ of the first lens group G1 in this objective lens $O_Z$ is 24.39 and the focal length $f_2$ of the second lens group G2 is $-24.33$. The zooming of this objective lens $O_Z$ from the first wide angle end $W_1$ to the first telephoto end $T_1$ is accomplished by the first lens group G1 and the second lens group G2 being both moved toward the object side so that the spacing $D_{12}$ between the first lens group G1 and the second lens group G2 is reduced as shown in FIGS. 7(a) and (b).

Here, the focal length of the objective lens $O_Z$ is $f_o$, the distance from the principal point of the first lens group G1 to the principal point of the second lens group G2 is $D_{12}$, and the distance from the principal point of the second lens group G2 to the image plane F is $D_2$, and the lens arrangement of each lens group in the objective lens $O_Z$ constituting a part of the fourth embodiment of the present invention is shown in Table 5 below.

TABLE 5

(the objective lens $O_Z$ for the fourth embodiment)

| $f_o$ | 36.0 | 51.6 | 70.0 |
|---|---|---|---|
| $D_{12}$ | 16.538 | 11.556 | 8.534 |
| $D_2$ | 11.586 | 27.149 | 45.505 |

To enlarge the focal length range of the objective lens $O_Z$ in the fourth embodiment of the present invention, in a state in which the group spacing of the objective lens $O_Z$ is $D_{12}=9.8$ and the focal length of the objective lens $O_Z$ is $f_{oc}=60.9$, a conversion lens CL (focal length $f_{CL}=-193.55$) having a negative refractive power is first disposed at a position of $D_{23}=11.1$ rearward of the second lens group G2 of this objective lens $O_Z$. The combined state of the objective lens $O_Z$ and the conversion lens CL in the second wide angle end $W_2$ is shown in FIG. 6(a).

The zooming from the second wide angle end $W_2$ to the second telephoto end $T_2$ is accomplished by the first lens group G1 and the second lens group G2 being moved toward the object side so that the spacing between the first lens group G1 and the second lens group G2 is reduced as shown in FIGS. 6(a) and (b) and at that time, the conversion lens CL being moved toward the object side with the second lens group G2.

Here, the combined focal length of the magnification changing photo-taking optical system in a state in which the conversion lens CL is added to the objective lens $O_Z$ is $f_c$, the distance from the principal point of the second lens group G2 to the principal point of the conversion lens CL is $D_{23}$, the distance from the principal point of the conversion lens CL to the image plane F is $D_3$, and the lens arrangement of each lens group in each focal length state when the conversion lens CL is added to the objective lens $O_Z$ is shown in Table 6 below.

TABLE 6

(the lens arrangement in each focal length state when the conversion lens CL is addded to the objective lens $O_Z$)

| $f_c$ | 70.0 | 85.0 | 100.0 |
|---|---|---|---|
| $D_{12}$ | 9.809 | 8.545 | 7.660 |
| $D_{23}$ | 11.055 | 11.055 | 11.055 |
| $D_3$ | 29.125 | 41.777 | 54.428 |

As can be seen from the lens arrangement shown in Table 6 above, a focal length $f_c=70.0-100.0$ can be added to the focal length $f_o=36.0-70.0$ zoom lens $O_Z$ having a zoom ratio of the order of 2.0, whereby achieving a magnification changing optical system substantially having an overall focal length $f_s=36.0-100.0$ and a zoom ratio of 2.8.

Figure 8:
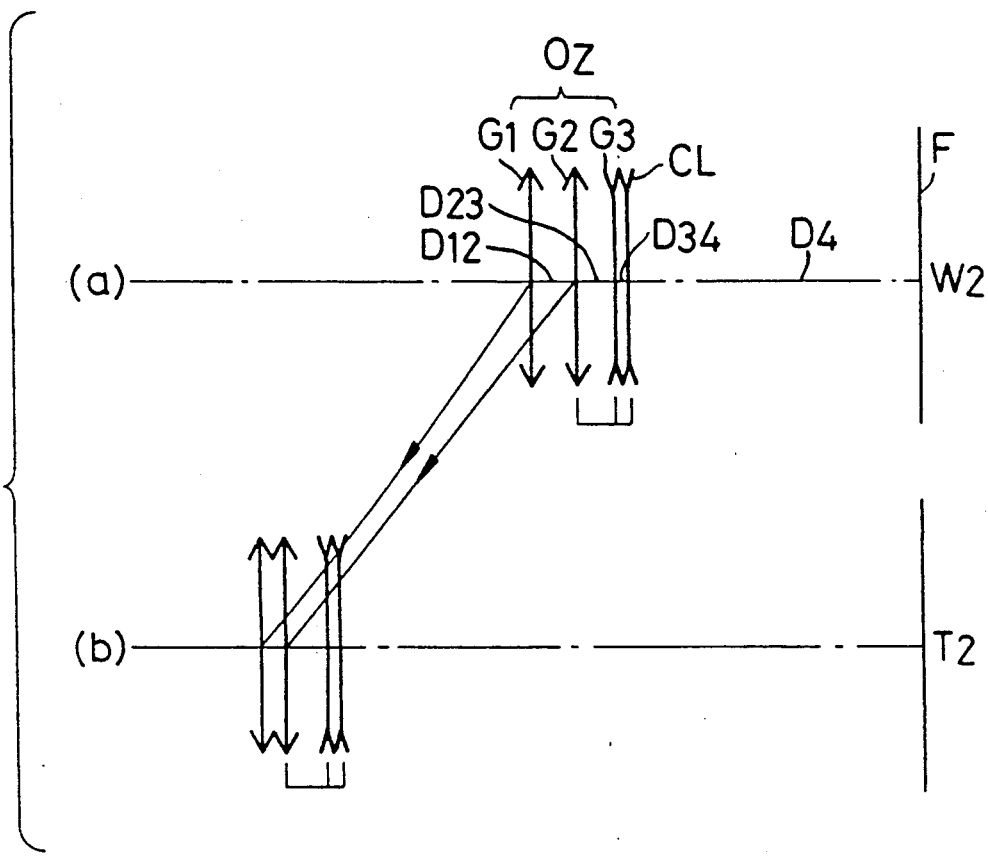
FIG. 8 is a schematic optical system arrangement diagram showing a lens arrangement in a state in which a conversion lens having a negative refractive power is added to an objective lens in a fifth embodiment of the present invention and the displaced state of the lens during a magnification change.

Fifth Embodiment (FIG. 8)

The objective lens $O_Z$ in a fifth embodiment shown in FIG. 8 is a three-group zoom lens, and in this embodiment, there is adopted a system in which a conversion lens CL, a third lens group G3 which is the last movable lens group of the zoom lens $O_Z$ and further, a second lens group G2 which is a movable lens group positioned more adjacent to the object side than the third lens group G3 are moved as a unit along the optic axis, whereby varying the combined focal length $f_c$ of the zoom lens $O_Z$ and the conversion lens CL.

Figure 9:
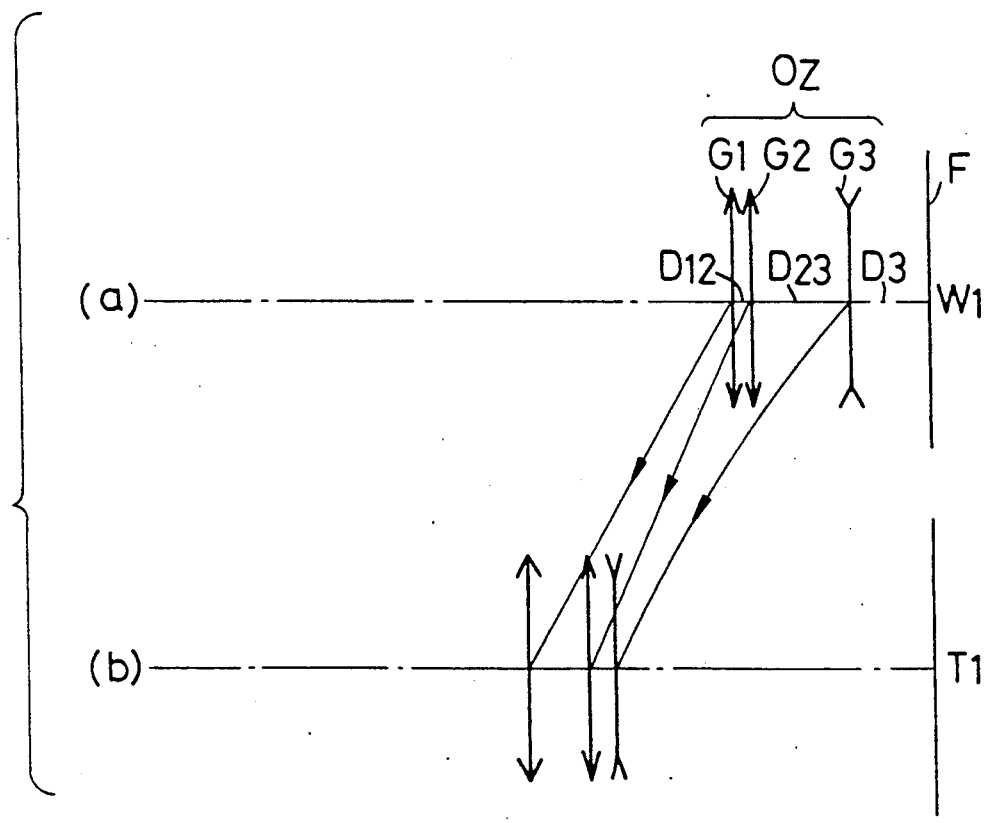
FIG. 9 is a schematic lens arrangement diagram showing a lens arrangement in the singly used state of the objective lens used in the fifth embodiment of the present invention shown in FIG. 8 and the displaced state of the lens during a magnification change.

The objective lens $O_Z$ in this fifth embodiment has a focal length $f_o=36.0-78.0$ and comprises three positive, positive and negative groups as shown in FIG. 9, and the focal length $f_1$ of the first lens group G1 in this objective lens $O_Z$ is 30.00, the focal length $f_2$ of the second lens group G2 is 90.00, and the focal length $f_3$ of the third lens group G3 is $-20.00$. The zooming of this objective lens $O_Z$ from the first wide angle end $W_1$ to the first telephoto end $T_1$ is accomplished by each group being independently moved toward the object side as shown in FIGS. 9(a) and (b).

Here, the focal length of the objective lens $O_Z$ is $f_o$, the distance from the principal point of the first lens group G1 to the principal point of the second lens group G2 is $D_{12}$, the distance from the principal point of the second lens group G2 to the principal point of the third lens group G3 is $D_{23}$, and the distance from the principal point of the third lens group G3 to the image plane is $D_3$, and the lens arrangement of each lens group in the objective lens $O_Z$ constituting a part of the fifth embodiment of the present invention is shown in Table 7 below.

TABLE 7

(the objective lens $O_Z$ for the fifth embodiment)

| $f_o$ | 36.0 | 51.6 | 78.0 |
|---|---|---|---|
| $D_{12}$ | 2.603 | 4.582 | 8.367 |
| $D_{23}$ | 13.781 | 8.888 | 3.643 |
| $D_3$ | 11.306 | 24.116 | 44.499 |

To enlarge the focal length range of the objective lens $O_Z$ in the fifth embodiment of the present invention, in a state in which the group spacings of the objective lens $O_Z$ are $D_{12}=6.6$ and $D_{23}=5.9$ and the focal length of the objective lens $O_Z$ is $f_{oc}=64.4$, a conversion lens CL (focal length $f_{CL}=-170.00$) having a negative refractive power is first disposed at a position of $D_{34}=1.00$ rearward of the third lens group G3 of this objective lens $O_Z$. The combined state of the objective lens $O_Z$ and the conversion lens CL in the second wide angle end $W_2$ of the magnification changing photo-taking optical system is shown in FIG. 8(a).

The zooming from the second wide angle end $W_2$ to the second telephoto end $T_2$ is accomplished by the first lens group G1 and the second lens group G2 being moved toward the object side so that the spacing $D_{12}$ between the first lens group G1 and the second lens group G2 is reduced as shown in FIGS. 8(a) and (b), and the second lens group G3 and the conversion lens CL being moved toward the object side with the second lens G2.

Here, the combined focal length of the magnification changing optical system in a state in which the conversion lens CL is added to the objective lens $O_Z$ is $f_c$, the distance from the principal point of the third lens group G3 to the principal point of the conversion lens CL is $D_{34}$, the distance from the principal point of the conversion lens CL to the image plane F is $D_4$, and the lens arrangement of each lens group in each focal length state when the conversion lens CL is added to the objective lens $O_Z$ is shown in Table 8 below.

TABLE 8

(the lens arrangement in each focal length state when the conversion lens CL is added to the objective lens $O_Z$)

| $f_c$ | 80.0 | 105.0 | 130.0 |
|---|---|---|---|
| $D_{12}$ | 6.636 | 4.473 | 3.143 |
| $D_{23}$ | 5.943 | 5.943 | 5.943 |
| $D_{34}$ | 1.000 | 1.000 | 1.000 |

TABLE 8-continued (the lens arrangement in each focal length state when the conversion lens CL is added to the objective lens $O_Z$)

| $D_4$ | 41.102 | 61.284 | 81.466 |
|---|---|---|---|

As can be seen from the lens arrangement shown in Table 8 above, a focal length $f_c=80.0-130.0$ is added to the focal length $f_o=36.0-78.0$ of the zoom lens $O_Z$ having a zoom ratio of the order of 2.0, whereby there can be achieved a magnification changing optical system substantially having an overall focal length $f_s=36.0-130.0$ and a zoom ratio 3.6.

Sixth Embodiment

Figure 10:
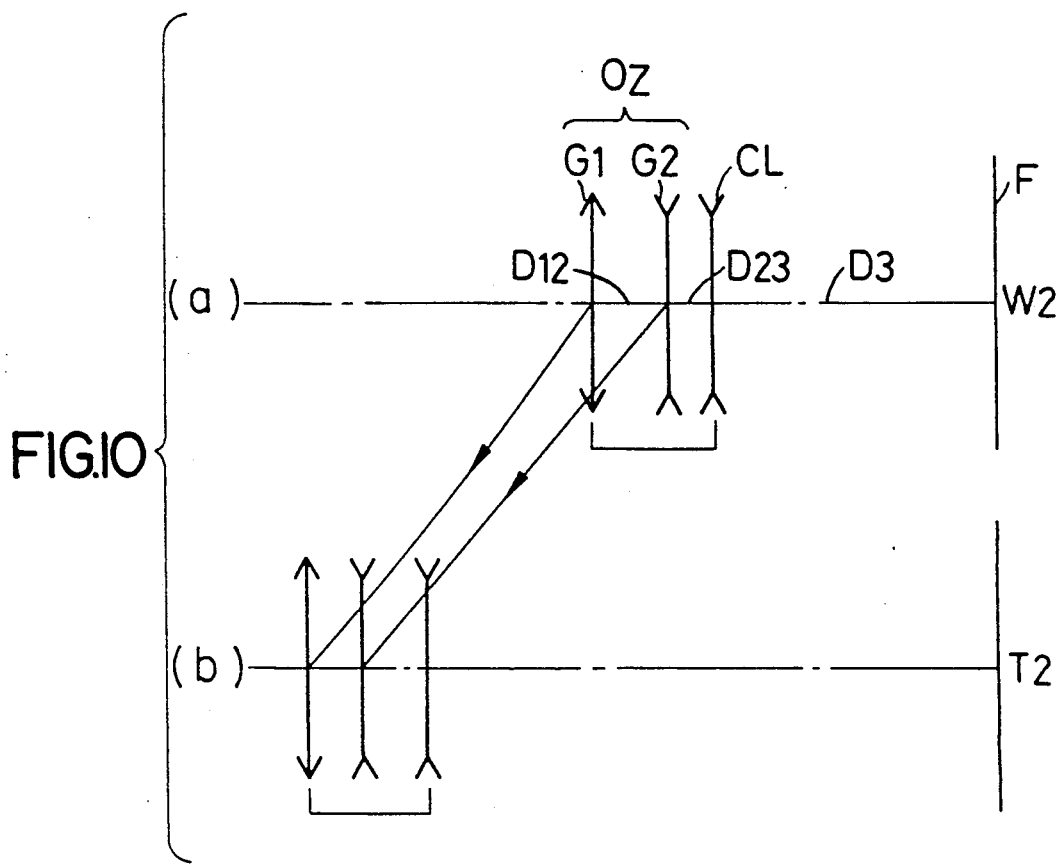
FIG. 10 is a schematic optical system arrangement diagram showing a lens arrangement in a state in which a conversion lens having a negative refractive power is added to an objective lens in a sixth embodiment of the present invention and the displaced state of the lens during a magnification change.

In a sixth embodiment shown in FIG. 10, there is adopted a system in which in conformity with the movement of a second lens group G2 (the last movable lens group of a two-group) zoom lens which is an objective lens $O_Z$, a first lens group G1 (the first movable lens group) and a conversion lens CL are moved together along the optic axis to thereby vary the combined focal length $f_c$ of the zoom lens $O_Z$ and the conversion lens CL.

Figure 11:
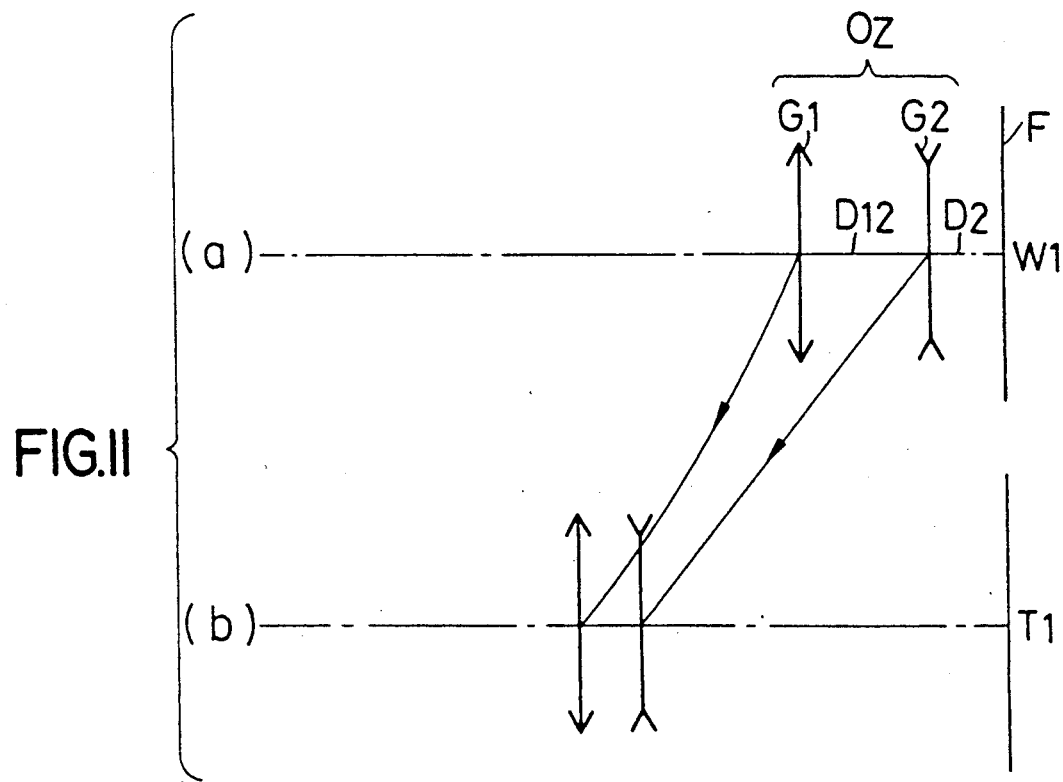
FIG. 11 is a schematic lens arrangement diagram showing a lens arrangement in the singly used state of the objective lens used in the sixth embodiment of the present invention shown in FIG. 10 and the displaced state of the lens during a magnification change.

The objective lens $O_Z$ in this sixth embodiment has a focal length $f_o=36.0-79.0$ and comprises two positive and negative groups as shown in FIG. 11, and the focal length $f_1$ of the first lens group G1 in this objective lens $O_Z$ is 25.42, and the focal length $f_2$ of the second lens group G2 is $-24.42$. The zooming of this objective lens $O_Z$ from the first wide angle end $W_1$ to the first telephoto end $T_1$ is accomplished by the first lens group G1 and the second lens group G2 being moved toward the object side so that the spacing $D_{12}$ between the first lens group G1 and the second lens group G2 is reduced as shown in FIGS. 11(a) and (b).

Here, the focal length of the objective lens $O_Z$ is $f_o$, and as shown in FIG. 11, the distance from the principal point of the first lens group G1 to the principal point of the second lens group G2 is $D_{12}$, and the distance from the principal point of the second lens group G2 to the image plane F is $D_2$, and the lens arrangement of each lens group in the objective lens $O_Z$ constituting a part of the sixth embodiment of the present invention is shown in Table 9 below.

TABLE 9

(the objective lens $O_Z$ for the sixth embodiment)

| $F_o$ | 36.0 | 55.0 | 79.0 |
|---|---|---|---|
| $D_{12}$ | 18.240 | 12.283 | 8.854 |
| $D_2$ | 10.167 | 28.423 | 51.482 |

To enlarge the focal length range of the objective lens $O_Z$ in the sixth embodiment of the present invention, in a state in which the group spacing $D_{12}$ of the objective lens $O_Z$ is $D_{12}=10.5$ and the focal length $f_{oc}$ of the objective lens $O_Z$ is $f_{oc}=65.2$, the conversion lens CL (focal length $f_{CL}=-170.64$) having a negative refractive power is first disposed at a position of $D_{23}=6.5$ rearward of the second lens group G2 of the objective lens $O_Z$. The combined state of the objective lens $O_Z$ and the conversion lens CL in the second wide angle end $W_2$ is shown in FIG. 10(a).

The zooming from the second wide angle end $W_2$ to the second telephoto end $T_2$ is accomplished by the first lens group G1 and the second lens group G2 being moved toward the object side so that the spacing $D_{12}$ between the first lens group G1 and the second lens group G2 is reduced as shown in FIGS. 10(a) and (b), and the conversion lens CL being moved toward the object side with the first lens group G1.

Here, in a state in which as shown in FIG. 10, the conversion lens CL is added to the objective lens $O_Z$, the focal length of the magnification changing phototaking optical system is $f_c$, the distance from the principal point of the second lens group G2 to the principal point of the conversion lens CL is $D_{23}$, and the distance from the principal point of the conversion lens CL to the image plane F is $D_3$, and the lens arrangement of each lens group in each focal length state when the conversion lens CL is added to the objective lens $O_Z$ is shown in Table 10 below.

TABLE 10

(the lens arrangement in each focal length state when the conversion lens CL is added to the objective lens $O_Z$)

| $F_c$ | 80.0 | 100.0 | 135.0 |
|---|---|---|---|
| $D_{12}$ | 10.524 | 9.155 | 7.755 |
| $D_{23}$ | 6.505 | 7.875 | 9.273 |
| $D_3$ | 38.890 | 53.633 | 80.181 |

As can be seen from the lens arrangement shown in Table 10 above, the focal length $f_c=80.0-135.0$ is added to the focal length $f_o=36.0-79.0$ of the zoom there can be achieved a magnification changing optical system substantially having an overall focal length $f_s=36.0-135.0$ and a zoom ratio 3.8.

Figure 12:
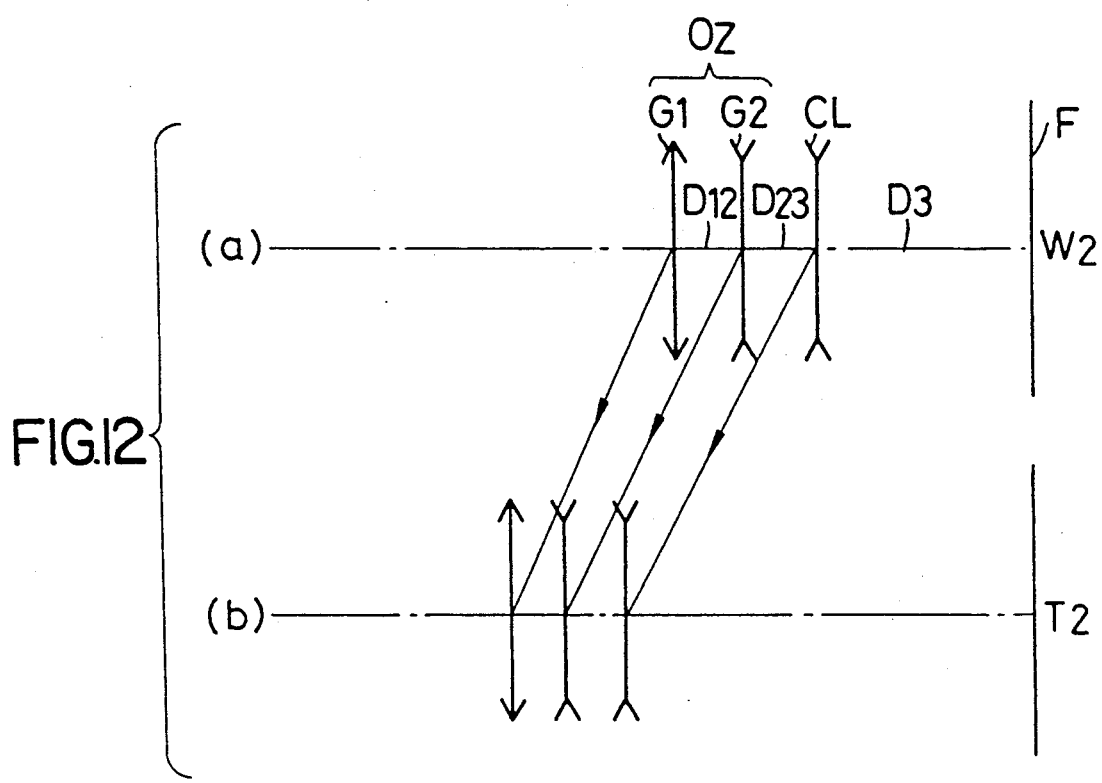
FIG. 12 is a schematic optical system arrangement diagram showing a lens arrangement in a state in which a conversion lens having a negative refractive power is added to an objective lens in a seventh embodiment of the present invention and the displaced state of the lens during a magnification change.
Figure 13:
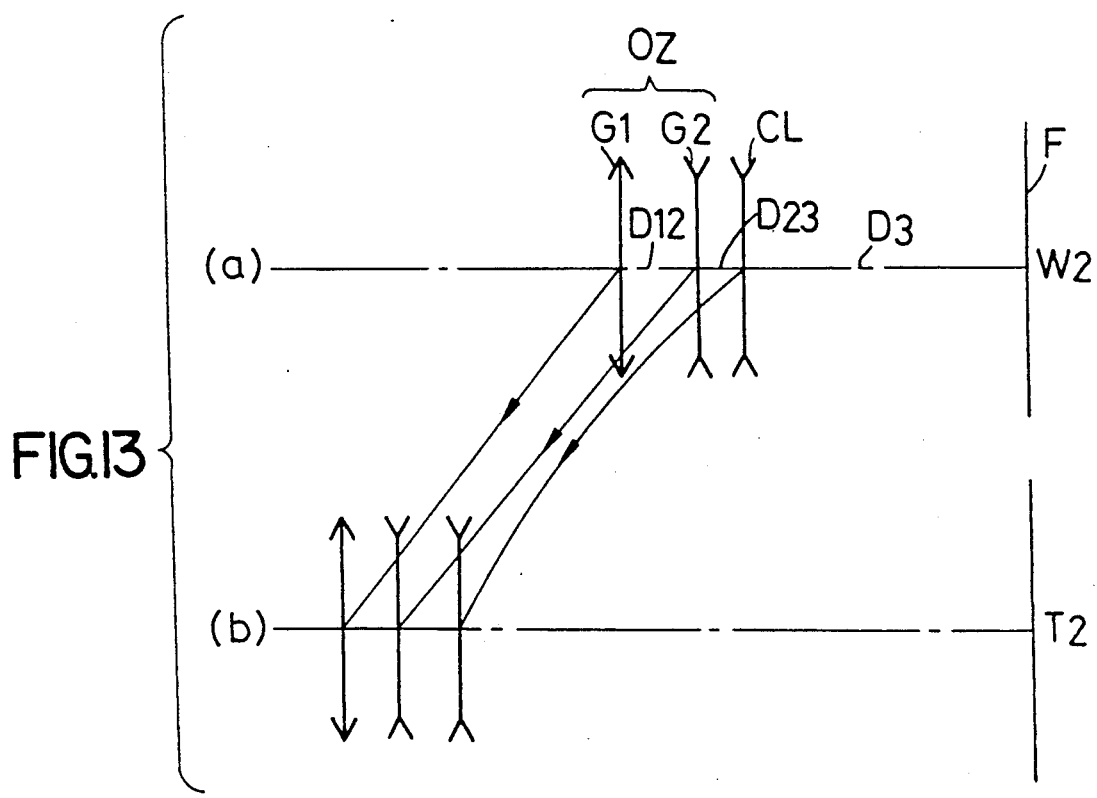
FIG. 13 is a schematic optical system arrangement diagram showing a lens arrangement in a state in which a conversion lens having a negative refractive power is added to an objective lens in an eighth embodiment of the present invention and the displaced state of the lens during a magnification change.

In FIGS. 12 and 13 showing seventh and eighth embodiments, respectively, there is adopted a system in which movable lens groups G1 and G2 in a two-group zoom lens which is an objective lens $O_Z$ and a conversion lens CL are moved independently of one another along the optic axis, thereby varying the combined focal length $f_c$ of the objective lens $O_Z$ and the conversion lens CL.

Seventh Embodiment

The objective lens $O_Z$ in the seventh embodiment shown in FIG. 12, like the objective lens in the fourth embodiment, has a focal length $f_o=36.0-70.0$ and comprises two positive and negative groups, and the focal length $f_1$ of the first lens group G1 in this objective lens $O_Z$ is 24.39, and the focal length $f_2$ of the second lens group G2 is −24.33. The zooming of this objective lens $O_Z$ from the first wide angle end $W_1$ to the first telephoto end $T_1$ is accomplished by the first lens group G1 and the second lens group G2 being moved toward the object side so that the spacing $D_{12}$ between the first lens group G1 and the second lens group G2 is reduced as shown in FIGS. 7(a) and (b), for the objective lens $O_Z$ constituting a part of the fourth embodiment.

Here, as shown in FIG. 7, the focal length of the objective lens $O_Z$ is $f_o$, the distance from the principal point of the first lens group G1 to the principal point of the second lens group G2 is $D_{12}$, and the distance from the principal point of the second lens group G2 to the image plane F is $D_2$, and the lens arrangement in the objective lens $O_Z$ constituting a part of the seventh embodiment of the present invention is shown in Table 11 below.

TABLE 11

(the objective lens $O_Z$ for the seventh embodiment)

| $f_o$ | 36.0 | 51.6 | 70.0 |
|---|---|---|---|
| $D_{12}$ | 16.538 | 11.556 | 8.534 |

TABLE 11-continued (the objective lens $O_Z$ for the seventh embodiment)

| $D_2$ | 11.586 | 27.149 | 45.505 |
|---|---|---|---|

In the seventh embodiment of the present invention, to enlarge the variable focal length range of the objective lens $O_Z$, in a state in which the group spacing $D_{12}$ of the objective lens $O_Z$ is $D_{12}=9.81$ and the focal length $f_{oc}$ of the objective lens $O_Z$ is $f_{oc}=60.9$, the conversion lens CL (focal length $f_{CL}=-193.55$) having a negative refractive power is first disposed at a position of $D_{23}=11.1$ rearward of the second lens group G2 of the objective lens $O_Z$. The combined state of the objective lens $O_Z$ and the conversion lens CL in the second wide angle end $W_2$ is shown in FIG. 12(a).

The zooming from the second wide angle end $W_2$ to the second telephoto end $T_2$ is accomplished by the first lens group G1 and the second lens group G2 being moved toward the object side so that the spacing $D_{12}$ between the first lens group G1 and the second lens group G2 is reduced as shown in FIGS. 12(a) and (b), and the conversion lens CL being also moved toward the object side. However, the first lens group G1 and the conversion lens CL are moved toward the object side at a speed ratio of 2:1 relative to the image plane F.

Here, the focal length of the magnification changing optical system in a state in which the conversion lens CL is added to the objective lens $O_Z$ is $f_c$, the distance from the principal point of the second lens group G2 to the principal point of the conversion lens CL is $D_{23}$, and the distance from the principal point of the conversion lens CL to the image plane F is $D_3$, and the lens arrangement of each lens group in each focal length state when the conversion lens CL is added to the objective lens $O_Z$ is shown in Table 12 below.

TABLE 12

(the lens arrangement in each focal length state when the conversion lens CL is added to the objective lens $O_Z$)

| $f_c$ | 70.0 | 85.0 | 100.0 |
|---|---|---|---|
| $D_{12}$ | 9.809 | 8.592 | 7.745 |
| $D_{23}$ | 11.055 | 9.785 | 8.500 |
| $D_3$ | 29.125 | 43.089 | 57.227 |

As can be seen from the lens arrangement shown in Table 12 above, the seventh embodiment differs from the fourth embodiment in the movement state of the lens groups, but is similar to the fourth embodiment in the other points, and the focal length $f_c=70.0-100.0$ is added to the focal length $f_o=36.0-70.0$ of the zoom lens $O_Z$ having a zoom ratio of the order of 2.0, whereby there can be achieved a magnification changing optical system substantially having an overall focal length $f_s=36.0-100.0$ and a zoom ratio 2.8.

Eighth Embodiment (FIG. 13)

The objective lens $O_Z$ in an eighth embodiment shown in FIG. 13, like the objective lens in the sixth embodiment, has a focal length $f_o=36.0-79.0$ and comprises two positive and negative groups as shown in FIG. 11, and the focal length $f_1$ of the first lens group G1 in this objective lens $O_Z$ is 25.42, and the focal length $f_2$ of the second lens group G2 is −24.42.

The zooming of this objective lens $O_Z$ from the first wide angle end $W_1$ to the first telephoto end $T_1$, like that of the objective lens $O_Z$ in the sixth embodiment, is accomplished by the first lens group G1 and the second lens group G2 being moved toward the object side so that the spacing $D_{12}$ between the first lens group G1 and the second lens group G2 is reduced as shown in FIGS. 11(a) and (b).

Here, as shown in FIG. 11, the focal length of the objective lens $O_Z$ is $f_o$, the distance from the principal point of the first lens group G1 to the principal point of the second lens group G2 to $D_{12}$, and the distance from the principal point of the second lens group G2 to the image plane F is $D_2$, and the lens arrangement in the objective lens $O_Z$ constituting a part of the eighth embodiment of the present invention is shown in Table 13 below.

TABLE 13

(the objective lens $O_Z$ for the eighth embodiment)

| $f_o$ | 36.0 | 55.0 | 79.0 |
|---|---|---|---|
| $D_{12}$ | 18.240 | 12.283 | 8.854 |
| $D_2$ | 10.167 | 28.423 | 51.482 |

To enlarge the focal length range of the objective lens $O_Z$ in the eighth embodiment of the present invention, as in the sixth embodiment, in a state in which the group spacing $D_{12}$ of the objective lens is $D_{12} = 10.5$ and the focal length $f_{oc}$ of the objective lens is $f_{oc} = 65.2$, a conversion lens CL (focal length $f = -170.64$) having a negative refractive power is first disposed at a position of $D_{23} = 6.5$ rearward of the second lens group G2 of the objective lens $O_Z$. The combined state of the objective lens $O_Z$ and the conversion lens CL in the second wide angle end $W_2$ is shown in FIG. 13(a).

During the zooming from the second wide angle end $W_2$ to the second telephoto end $T_2$, the first lens group G1 and the second lens group G2 are rectilinearly moved together toward the object side so that the spacing between these lens groups is reduced as shown in FIGS. 13(a) and (b), and the conversion lens CL is non-linearly moved toward the object side relative to these two lens groups.

Here, in a state in which as shown in FIG. 13, the conversion lens CL is added to the objective lens $O_Z$, the focal length $f_c$ of the magnification changing optical system is $f_c$, the distance from the principal point of the second lens group G2 to the principal point of the conversion lens CL is $D_{23}$, and the distance from the principal point of the conversion lens CL to the image plane is $D_3$, and the lens arrangement of each lens group in each focal length state when the conversion lens CL is added to the objective lens $O_Z$ is shown in Table 14 below.

TABLE 14

(the lens arrangement in each focal length state when the conversion lens CL is added to the objective lens $O_Z$)

| $f_c$ | 80.0 | 100.0 | 135.0 |
|---|---|---|---|
| $D_{12}$ | 10.524 | 9.252 | 7.755 |
| $D_{23}$ | 6.505 | 5.480 | 9.273 |
| $D_3$ | 38.890 | 56.312 | 80.181 |

As can be seen from the lens arrangement shown in Table 14, the eighth embodiment differs more or less from the sixth embodiment in the lens arrangement, but as in the sixth embodiment, the focal length $f_c = 80.0-135.0$ is added to the focal length $f_o = 36.0-79.0$ of the zoom lens $O_Z$ having a zoom ratio of the order of 2.0, whereby there can be achieved a magnification changing optical system substantially having an overall focal length $f_s = 36.0-135.0$ and a zoom ratio 3.8

TABLE 15

(table corresponding to conditions)

Condition (1) ... $f_{oc} > \sqrt{f_W \cdot f_T}$

| Embodiment | $f_{oc}$ | $f_W$ | $f_T$ | $\sqrt{f_W \cdot f_T}$ |
|---|---|---|---|---|
| 3 | 68.0 | 36.0 | 68.0 | 49.5 |
| 4 | 60.9–78.1 | 36.0 | 70.0 | 50.2 |
| 5 | 64.4–87.9 | 36.0 | 78.0 | 53.0 |
| 6 | 65.2–91.9 | 36.0 | 79.0 | 53.3 |
| 7 | 60.9–77.2 | 36.0 | 70.0 | 50.2 |
| 8 | 65.2–91.9 | 36.0 | 79.0 | 53.3 |

Condition (2) ... $O \leq L_{CT} \leq L - L_{Min}$

| Embodiment | $f_c$ | $L_{CT}$ | $L$ | $L_{Min}$ | $L - L_{Min}$ |
|---|---|---|---|---|---|
| 3 | 100.1–120.0 | 22.4–1.2 | 82.6 | 60.2 | 22.4 |
| 4 | 70.0–100.0 | 11.1 | 36.4–53.6 | 11.6 | 24.8–42.0 |
| 5 | 80.0–130.0 | 1.0 | 34.1–56.1 | 11.3 | 22.8–44.8 |
| 6 | 80.0–135.0 | 6.5–9.3 | 38.2–63.9 | 10.2 | 28.0–53.7 |
| 7 | 70.0–100.0 | 11.1–8.5 | 36.4–52.7 | 11.6 | 24.8–41.1 |
| 8 | 80.0–135.0 | 6.5–9.3 | 38.2–63.9 | 10.2 | 28.0–53.7 |

Table 15 shows that the third to eighth embodiments satisfy the conditions (1) and (2).

Thus, each of the above-described embodiments can provide a relatively compact magnification changing photo-taking optical system in which during a magnification change, the conversion lens CL is moved along the optic axis to contribute to a magnification change, whereby efficient magnification change can be accomplished.

Of course, it is also possible to contrive a reduction in the combined focal length of the objective lens and the conversion lens having a positive refractive power by the conversion lens, and move the conversion lens along the optic axis to thereby vary the reduced combined focal length and make a wide angle zoom lens.

Also, where the objective lens is a zoom lens, it is not always necessary that the variable focus area before and after the mounting of the conversion lens be continuously constructed, but such variable focus area may be intermittently constructed. Also, in the magnification changing photo-taking optical system, it is possible to construct the present invention so as to be stepwisely set to a plurality of predetermined magnification states.

As described above, the objective lens to be combined with the conversion lens is not limited in the construction thereof, but the present invention is also effective in a zoom lens of four or more groups or a fixed focus lens of two or more groups.

Further, where the objective lens is a zoom lens, it is also possible to simplify the lens mechanism by making the locus of movement of the objective lens by zooming and the locus of movement of the objective lens when zoomed after the conversion lens is mounted common to each other.

Also, conversely from what has been described just above, in an optical system having an objective lens and a conversion lens, it is possible to remove the conversion lens and move a plurality of remaining lens groups relative to one another along the optic axis to thereby change the magnification changing area.

According to the present invention, there can be achieved a magnification changing photo-taking optical system which maintains a relatively compact shape and can be contained in a camera body and can make a fixed focus lens into a zoom lens and which can change the magnification changing area of the zoom lens and has a wide variable focal length range.

We claim:

1. A variable focal length photo-taking optical system including:
   a photo-taking objective lens; and
   a conversion lens removably added to said photo-taking objective lens, at least some lens groups of said objective lens and said conversion lens being movable along an optic axis concurrently in a manner that changes the combined focal length of said photo-taking objective lens and said conversion lens.

2. A variable focal length photo-taking optical system according to claim 1, wherein said photo-taking objective lens is a fixed focus lens of invariable focal length, and said conversion lens is positioned at the image side of said photo-taking objective lens and has a negative refractive power and is designed to shorten the spacing between the principal points of said two lenses while being moved toward the object side with said photo-taking objective lens to change said combined focal length from the wide angle end to the telephoto end.

3. A variable focal length photo-taking optical system according to claim 1, wherein said photo-taking objective lens is a fixed focus lens of invariable focal length and is designed to be moved toward the image side to change said combined focal length from the telephoto end to the wide angle end, and said conversion lens is positioned at the image side of said photo-taking objective lens and has a positive refractive power and is designed to be moved toward the object side to change said combined focal length from the telephoto end to the wide angle end.

4. A variable focal length photo-taking optical system according to claim 1, wherein said photo-taking objective lens is a variable focal length lens and is designed to be fixed at a predetermined focal length and function as a fixed focus lens of invariable focal length when said combined focal length in changed.

5. A variable focal length photo-taking optical system according to claim 4, wherein said photo-taking objective lens is a variable focal length lens having, in succession from the object side, a negative first movable lens group and a positive second movable lens group, said conversion lens is positioned more adjacent to the image side than said second movable lens group and has a negative refractive power, and wherein said first movable lens group and said second movable lens group are designed to be moved together toward the object side and said conversion lens is designed to be moved toward the object side so as to reduce the distance between it and said second movable lens group to enlarge said combined focal length.

6. A variable focal length photo-taking optical system according to claim 1, wherein said photo-taking objective lens is a variable focal length lens having a plurality of movable lens groups, and said conversion lens is positioned at the image side of said photo-taking objective lens and is designed to be moved with one of the plurality of movable lens groups of said photo-taking objective lens which is positioned adjacent to the conversion lens to change said combined focal length.

7. A variable focal length photo-taking optical system according to claim 6, wherein said photo-taking objective lens is a variable focal length lens having, in succession from the object side, a positive first movable lens group and a negative second movable lens group, said conversion lens is positioned more adjacent to the image side than said second movable lens group and has a negative refractive power, said first movable lens group and said second movable lens group are designed to be moved toward the object side while reducing the spacing therebetween to enlarge said combined focal length, and said conversion lens is designed to be moved with said second movable lens group.

8. A variable focal length photo-taking optical system according to claim 1, wherein said photo-taking objective lens is a variable focal length lens having a plurality of movable lens groups, and said conversion lens is positioned at the image side of said photo-taking objective lens and is designed to be moved with one of the plurality of movable lens groups of said photo-taking objective lens which is positioned adjacent to the conversion lens and at least one movable lens group which is positioned more adjacent to the object side to change said combined focal length.

9. A variable focal length photo-taking optical system according to claim 8, wherein said photo-taking objective lens is a variable focal length lens having, in succession from the object side, a positive first movable lens group, a positive second movable lens group and a negative third movable lens group, said conversion lens is positioned more adjacent to the image side than said third movable lens group and has a negative refractive power, said first movable lens group and said second movable lens group are designed to be moved toward the object side while reducing the spacing therebetween to enlarge said combined focal length, and said conversion lens is designed to be moved with said second movable lens group and said third movable lens group.

10. A variable focal length photo-taking optical system according to claim 1, wherein said photo-taking objective lens is a variable focal length lens having a plurality of movable lens groups, and said conversion lens is positioned at the image side of said photo-taking objective lens and is designed to be moved with at least one movable lens group positioned more adjacent to the object side than another of the plurality of movable lens groups of said photo-taking objective lens.

11. A variable focal length photo-taking optical system according to claim 10, wherein said photo-taking objective lens is a variable focal length lens having, in succession from the object side, a positive first movable lens group and a negative second movable lens group, said conversion lens is positioned more adjacent to the image side than said second movable lens group and has a negative refractive power, said first movable lens group and said second movable lens group are designed to be moved toward the object side while reducing the spacing therebetween to enlarge said combined focal length, and said conversion lens is designed to be moved toward the object side with said first movable lens group.

12. A variable focal length photo-taking optical system according to claim 1, wherein said photo-taking objective lens is a variable focal length lens having a plurality of movable lens groups, and said conversion lens is positioned at the image side of said photo-taking objective lens and is designed to be moved independently of the plurality of movable lens groups of said photo-taking objective lens to change said combined focal length.

13. A variable focal length photo-taking optical system according to claim 12, wherein said photo-taking objective lens is a variable focal length lens having, in succession from the object side, a positive first movable lens group and a negative second movable lens group, said conversion lens is positioned more adjacent to the image side than said second movable lens group and has a negative refractive power, and said first movable lens group, said second movable lens group and said conversion lens are designed to be moved toward the object side independently of one another to enlarge said combined focal length.

14. A variable focal length photo-taking optical system according to claim 1, wherein said photo-taking objective lens is a variable focal length lens having a plurality of movable lens groups, said conversion lens is added to the image side of said photo-taking objective lens, and said photo-taking objective lens and said conversion lens are designed to satisfy the following conditions at that time:

$$f_{oc} > \sqrt{f_W \cdot f_T} \quad (1)$$

$$0 \leq L_{CT} \leq L - L_{Min} \quad (2)$$

where $f_{oc}$: the focal length of said photo-taking objective lens in a state in which said conversion lens is added $f_W$: the focal length at the wide angle end of said photo-taking objective lens $f_T$: the focal length at the telephoto end of said photo-taking objective lens $L_{CT}$: the distance from the lens surface of said photo-taking objective lens which is most adjacent to the image side to the lens surface of said conversion lens which is most adjacent to the object side in the state in which said conversion lens is added.

$L$: the distance from the lens surface of said photo-taking objective lens which is most adjacent to the image side to the image plane in the state in which said conversion lens is added $L_{min}$: the distance in a state in which the distance from the lens surface of said photo-taking objective lens which is most adjacent to the image side to the image plane is minimum.

15. A variable focal length photo-taking optical system according to claim 2, which is constructed in accordance with the data described in the following table, where the focal length of said photo-taking objective lens is $f_s = 35.00$, the focal length of said conversion lens is $f_{CL} = -41.00$, said combined focal length in a state in which said conversion lens is added to said photo-taking objective lens is $f_c$, the distance from the principal point of said photo-taking objective lens to the principal point of said conversion lens is $D_{12}$, and the distance from the principal point of said conversion lens to the image plane is $D_2$:

| $f_c$ | 60.0 | 80.0 | 100.0 |
|---|---|---|---|
| $D_{12}$ | 17.916 | 11.937 | 8.350 |
| $D_2$ | 29.287 | 52.716 | 76.145 |

16. A variable focal length photo-taking optical system according to claim 3, which is constructed in accordance with the data described in the following table, where the focal length of said photo-taking objective lens is $f_s = 35.00$, the focal length of said conversion lens is $f_{CL} = 41.00$, said combined focal length in a state in which said conversion lens is added to said photo-taking objective lens is $f_c$, the distance from the principal point of said photo-taking objective lens to the principal point of said conversion lens is $D_{12}$, and the distance from the principal point of said conversion lens to the image plane is $D_2$:

| $f_c$ | 19.0 | 21.0 | 23.0 |
|---|---|---|---|
| $D_{12}$ | 0.474 | 7.667 | 13.609 |
| $D_2$ | 18.743 | 16.400 | 14.057 |

17. A variable focal length photo-taking optical system according to claim 5, wherein said photo-taking objective lens is constructed in accordance with the data described in the following table, where the focal length of said first movable lens group is $f_1 = -50.00$, the focal length of said second movable lens group is $f_2 = 35.00$, the focal length of said photo-taking objective lens is $f_o$, the distance from the principal point of said first movable lens group to the principal point of said second movable lens group is $D_{12}$, and the distance from the principal point of said second movable lens group to the image plane is $D_2$:

| $f_o$ | 36.0 | 51.6 | 68.0 |
|---|---|---|---|
| $D_{12}$ | 33.611 | 18.915 | 10.735 |
| $D_2$ | 60.200 | 71.120 | 82.600 | and wherein said photo-taking optical system is constructed in accordance with the data described in the following table, where the focal length of said conversion lens is $f_{CL} = -187.82$, said combined focal length is $f_c$, the distance from the principal point of said second movable lens group to the principal point of said conversion lens is $D_{23}$, and the distance from the principal point of said conversion lens to the image plane is $D_3$:

| $f_c$ | 100.0 | 110.0 | 120.0 |
|---|---|---|---|
| $D_{12}$ | 10.735 | 10.735 | 10.735 |
| $D_{23}$ | 22.400 | 10.889 | 1.214 |
| $D_3$ | 88.598 | 116.002 | 143.623 |

18. A variable focal length photo-taking optical system according to claim 7, wherein said photo-taking objective lens is constructed in accordance with the data described in the following table, where the focal length of said first movable lens group is $f_1 = 24.39$, the focal length of said second movable lens group is $f_2 = -24.33$, the focal length of said photo-taking objective lens is $f_o$, the distance from the principal point of said first movable lens group to the principal point of said second movable lens group is $D_{12}$, and the distance from the principal point of said second movable lens group to the image plane is $D_2$:

| $f_o$ | 36.0 | 51.6 | 70.0 |
|---|---|---|---|
| $D_{12}$ | 16.538 | 11.556 | 8.534 |
| $D_2$ | 11.586 | 27.149 | 45.505 | and wherein said photo-taking optical system is constructed in accordance with the data described in the following table, where the focal length of said conversion lens is $f_{CL} = -193.55$, said combined focal length is $f_c$, the distance from the principal point of said second movable lens group to the principal point of said conversion lens is $D_{23}$, and the distance from the principal point of said conversion lens to the image plane is $D_3$:

| $f_c$ | 70.0 | 85.0 | 100.0 |
|---|---|---|---|
| $D_{12}$ | 9.809 | 8.545 | 7.660 |
| $D_{23}$ | 11.055 | 11.055 | 11.055 |
| $D_3$ | 29.125 | 41.777 | 54.428 |

19. A variable focal length photo-taking optical system according to claim 9, wherein said photo-taking objective lens is constructed in accordance with the data described in the following table, where the focal length of said first movable lens group is $f_1 = 30.00$, the focal length of said second movable lens group is $f_2 = 90.00$, the focal length of said third movable lens group is $f_3 = -20.00$, the focal length of said photo-taking objective lens is $f_o$, the distance from the principal point of said first movable lens group to the principal point of said second movable lens group is $D_{12}$, the distance from the principal point of said second movable lens group to the principal point of said third movable lens group is $D_{23}$, and the distance from the principal point of said third movable lens group to the image plane is $D_3$:

| $f_o$ | 36.0 | 51.6 | 78.0 |
|---|---|---|---|
| $D_{12}$ | 2.603 | 4.582 | 8.367 |
| $D_{23}$ | 13.781 | 8.888 | 3.643 |
| $D_3$ | 11.306 | 24.116 | 54.499 | and wherein said photo-taking optical system is constructed in accordance with the data described in the following table, where the focal length of said conversion lens is $f_{CL} = -170.00$, said combined focal length is $f_c$, the distance from the principal point of said third movable lens group to the principal point of said conversion lens is $D_{34}$, and the distance from the principal point of said conversion lens to the image plane is $D_4$:

| $f_c$ | 80.0 | 105.0 | 130.0 |
|---|---|---|---|
| $D_{12}$ | 6.636 | 4.473 | 3.143 |
| $D_{23}$ | 5.943 | 5.943 | 5.943 |
| $D_{34}$ | 1.000 | 1.000 | 1.000 |
| $D_4$ | 41.102 | 61.284 | 81.466 |

20. A variable focal length photo-taking optical system according to claim 11, wherein said photo-taking objective lens is constructed in accordance with the data described in the following table, where the focal length of said first movable lens group is $f_1 = 25.42$, the focal length of said second movable lens group is $f_2 = -24.42$, the focal length of said photo-taking objective lens is $f_o$, the distance from the principal point of said first movable lens group to the principal point of said second movable lens group is $D_{12}$, and the distance from the principal point of said second movable lens group to the image plane is $D_2$:

| $f_o$ | 36.0 | 55.0 | 79.0 |
|---|---|---|---|
| $D_{12}$ | 18.240 | 12.283 | 8.854 |
| $D_2$ | 10.167 | 28.423 | 51.482 | and wherein said photo-taking optical system is constructed in accordance with the data described in the following table, where the focal length of said conversion lens is $f_{CL} = -170.64$, said combined focal length is $f_c$, the distance from the principal point of said second movable lens group to the principal point of said conversion lens is $D_{23}$, and the distance from the principal point of said conversion lens to the image plane is $D_3$:

| $f_c$ | 80.0 | 100.0 | 135.0 |
|---|---|---|---|
| $D_{12}$ | 10.524 | 9.155 | 7.755 |
| $D_{23}$ | 6.505 | 7.875 | 9.273 |
| $D_3$ | 38.890 | 53.633 | 80.181 |

21. A variable focal length photo-taking optical system according to claim 13, wherein said photo-taking objective lens is constructed in accordance with the data described in the following table, where the focal length of said first movable lens group is $f_1 = 24.39$, the focal length of said second movable lens group is $f_2 = -24.33$, the focal length of said photo-taking objective lens is $f_o$, the distance from the principal point of said first movable lens group to the principal point of said second movable lens group is $D_{12}$, and the distance from the principal point of said second movable lens group to the image plane is $D_2$:

| $f_o$ | 36.0 | 51.6 | 70.0 |
|---|---|---|---|
| $D_{12}$ | 16.538 | 11.556 | 8.534 |
| $D_2$ | 11.586 | 27.149 | 45.505 | and wherein said photo-taking optical system is constructed in accordance with the data described in the following table, where the focal length of said conversion lens if $f_{CL} = -193.55$, said combined focal length is $f_c$, the distance from the principal point of said second movable lens group to the principal point of said conversion lens is $D_{23}$, and the distance from the principal point of said conversion lens to the image plane is $D_3$:

| $f_c$ | 70.0 | 85.0 | 100.0 |
|---|---|---|---|
| $D_{12}$ | 9.809 | 8.592 | 7.745 |
| $D_{23}$ | 11.055 | 9.785 | 8.500 |
| $D_3$ | 29.125 | 43.089 | 57.227 |

22. A variable focal length photo-taking optical system according to claim 13, wherein said photo-taking objective lens is constructed in accordance with the data described in the following table, where the focal length of said first movable lens group is $f_1 = 25.42$, the focal length of said second movable lens group is $f_2 = -24.42$, the focal length of said photo-taking objective lens is $f_o$, the distance from the principal point of said first movable lens group to the principal point of said second movable lens group is $D_{12}$, and the distance from the principal point of said second movable lens group to the image plane is $D_2$:

| $f_o$ | 36.0 | 55.0 | 79.0 |
|---|---|---|---|
| $D_{12}$ | 18.240 | 12.283 | 8.854 |
| $D_2$ | 10.167 | 28.423 | 51.482 | and wherein said photo-taking optical system is constructed in accordance with the data described in the following table, where the focal length of said conversion lens is $f_{CL} = -170.64$, said combined focal length is $f_c$, the distance from the principal point of said second movable lens group to the principal point of said conversion lens is $D_{23}$, and the distance from the principal point of said conversion lens to the image plane is $D_3$:

| $f_c$ | 80.0 | 100.0 | 135.0 |
|---|---|---|---|
| $D_{12}$ | 10.524 | 9.252 | 7.755 |
| $D_{23}$ | 6.505 | 5.480 | 9.273 |
| $D_3$ | 38.890 | 56.312 | 80.181 |

* * * * *